United States Patent [19]

Kilcy

[11] 4,374,365

[45] Feb. 15, 1983

[54] METHOD AND APPARATUS FOR PRODUCING 360 DEGREE RADIATION WITH STATIC COMPONENTS

[76] Inventor: James J. Kilcy, 2066 Partridge La., Binghamton, N.Y. 13903

[21] Appl. No.: 47,284

[22] Filed: Jun. 11, 1979

[51] Int. Cl.³ .............................................. H01S 3/03
[52] U.S. Cl. ......................................... 372/92; 372/24
[58] Field of Search .................... 331/94.5 K, 94.5 C, 331/94.5 M, 94.5 H

[56] References Cited

U.S. PATENT DOCUMENTS 3,140,451  7/1964  Fox ................................. 331/94.5 C
3,241,085  3/1966  Marcatili ....................... 331/94.5 C

*Primary Examiner*—William L. Sikes
*Assistant Examiner*—Léon Scott, Jr.
*Attorney, Agent, or Firm*—Charles S. McGuire

[57] ABSTRACT

A beam of coherent light is generated in a 360° pattern about a central axis perpendicular to the beam, either outwardly from or inwardly toward the axis, without requiring moving parts. The beam is introduced into the space between concentric, cylindrical surfaces, both reflective to some extent, but one more highly reflective than the other, with respect to the wavelength of the beam. After multiple reflections between the surfaces, the beam passes through the less reflective surface about the entire 360° circumference thereof. In a first embodiment the beam is generated by a conventional laser, or the like, and directed along an axis which perpendicularly intersects the axis of a hollow tube having external and internal surfaces which provide the aforementioned multiple reflections. Reflectivity of essentially 100% by the inner surface may be provided by filling the hollow tube with mercury, or other highly reflective substances, and secondary optics may be arranged to provide more uniform intensity in each radial segment of the beam. In a second embodiment the beam is generated within the space between the reflective surfaces by pumping an active medium arranged therein to an energy level sufficient to produce lasing with the beam radiating outwardly through the larger diameter surface, or inwardly to the central axis through the inner surface.

9 Claims, 16 Drawing Figures

METHOD AND APPARATUS FOR PRODUCING 360 DEGREE RADIATION WITH STATIC COMPONENTS

BACKGROUND OF THE INVENTION

The present invention relates to manipulation of coherent light beams and, more specifically, to methods and means for providing a coherent light beam which extends radially 360° about a central axis perpendicular thereto.

Since their discovery and commercial introduction some 20 years ago, laser devices have been usefully employed in a wide number of applications. Among these are applications requiring that the beam axis be moved or scanned in a circular pattern about an axis perpendicular thereto. That is, the beam is caused to move through 360° arcs about a central point on the plane. This is commonly accomplished by a mirror or prism placed on a direct or reflected beam axis and moved as required to effect the scan. Such devices are used, for example, in surveying and inspection applications, among others.

Such systems obviously require moving parts, e.g., a mirror or prism on the output shaft of a motor, and sometimes means such as a shaft encoder to generate clock signals which relate to the angular rotation of the mirror. In addition to increasing the costs of constructing and maintaining the apparatus, other problems are inherent in generating the desired beam scan, maintaining precise alignment of moving parts, and collecting the incident or reflected radiation, where required, for evaluation of various data produced thereby. The principal object of the present invention is to provide a method and apparatus for producing a beam in a circular pattern about an axis perpendicular to the beam with no moving parts.

A further object is to provide means for generating a beam of coherent light in a 360° circular pattern which is of essentially constant intensity at each radial segment.

An additional object is to provide means for converting a relatively narrow, collimated beam of coherent radiation to an essentially planar beam extending infinitely outward for 360° about a central point.

Still another object is to provide a method and means for pumping a resonant cavity to produce a laser beam extending for 360° about a central point, either diverging from or converging to said point.

Other objects will in part be obvious and will in part appear hereinafter.

SUMMARY OF THE INVENTION

In a first embodiment, the invention contemplates a source, preferably a laser, for generating a relatively narrow, collimated beam of coherent radiation along a linear axis, and means for intercepting the beam and dispersing it in an essentially planar form. The intercepting and dispersing means comprise a cylindrical tube having an outer surface through which the beam is transmitted and arranged with its axis perpendicularly intersecting the beam axis, either direct or reflected. The tube has a central, axial bore the diameter of which is preferably much smaller than the outside diameter of the tube. The internal surface or bore of the tube is rendered highly reflective as by coating or filling with mercury, or another substance which is highly reflective with respect to the radiation forming the intersected beam, the latter preferably having a transverse dimension approximately equal to, but in no case greater than, the outside diameter of the tube.

The intensity of the beam in each radial segment may be rendered more uniform by placing additional optical elements in predetermined relation to the primary optic, i.e., the aforementioned capillary tube. That is, although a single, hollow tube having a reflective material on its internal surface will produce an essentially planar beam radiating outwardly from the tube for 360° about the axis thereof, the beam will be of significantly higher intensity in some radial segments than in others. This condition may be improved by placing reflective and/or refractive elements in the segments of higher intensity to reflect or divert the radiation to segments which would otherwise have a lower intensity. In a preferred configuration, one or more additional hollow tubes are placed in parallel relation thereto, at least one of the additional tubes being diametrically opposite the point at which the beam is incident thereupon.

In a second embodiment a pair of opposed, concentric, cylindrical mirrors are arranged between two parallel planes to define a space enclosing an active medium of any type suitable for use in laser applications. The active medium is pumped by conventional means to an energy level sufficient to produce lasing after multiple reflections between the two mirrors to produce an optically resonant circuit. The laser beam passes through the less reflective (more transmissive) of the mirrors about the entire 360° circumference thereof.

BRIEF DESCRIPTION OF THE DRAWINGS

FIG. 1b is a general diagram of the radial intensity of the beam after striking the rod of FIG. 1a;

FIG. 2b is a general diagram of the radial intensity of the beam after striking the tube of FIG. 2a;

FIG. 4b is a polar growth of the radial intensity of the beam scan after striking the optical arrangement of FIG. 4a;

DETAILED DESCRIPTION

Figure 1A:
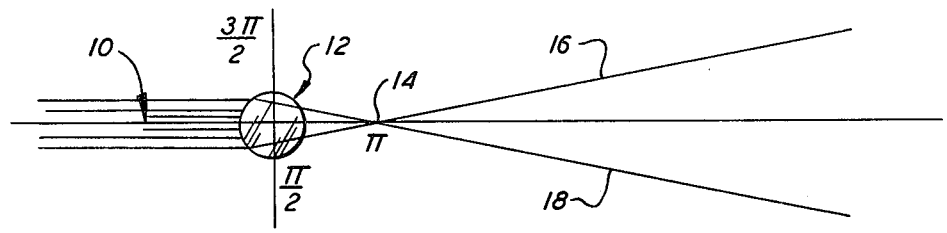
FIG. 1a is a diagrammatic plan view of the known scan of a beam striking a solid cylindrical rod.
Figure 1B:
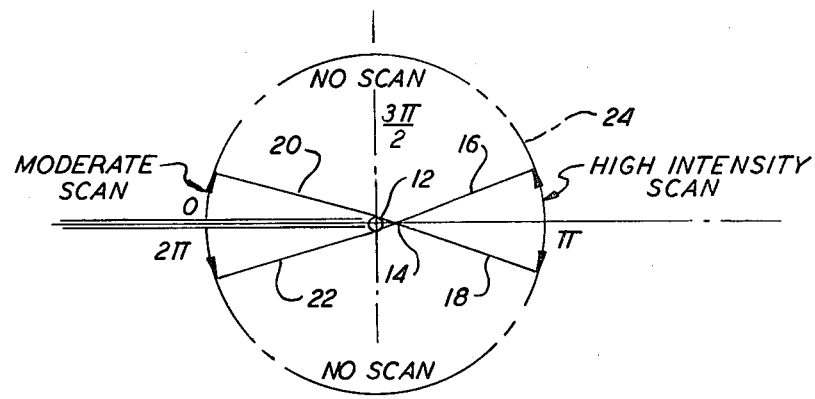

Referring now to the drawings, in FIG. 1a the reference numeral 10 denotes a beam of collimated radiation, such as would be produced by a conventional laser tube. Solid, cylindrical rod 12 is positioned in the path of beam 10 with the longitudinal axis of the rod intersecting and perpendicular to that of the beam. Rod 12 may be of glass, plastic or other transparent crystal or chemical structure. Rod 12 is larger in diameter than beam 10 and will act as a cylindrical lens, focusing the beam at point 14. The resulting scan of the beam will fall between lines 16 and 18, having an included angle dependent upon the relative diameters of beam 10 and tube 12. Although the tube is of transparent material, there will be some degree of reflection of beam 10. Thus, there will also be a scan between the lines indicated at 20 and 22 in FIG. 1b of low or moderate intensity relative to the scan between lines 16 and 18. An imaginary circle in the plane of the beam is indicated at 24 and divided into quadrants denoted in relation to its radius, as are the diagrams showing radial relative scan intensities in FIGS. 2b, 3c and 4b.

Figure 2A:
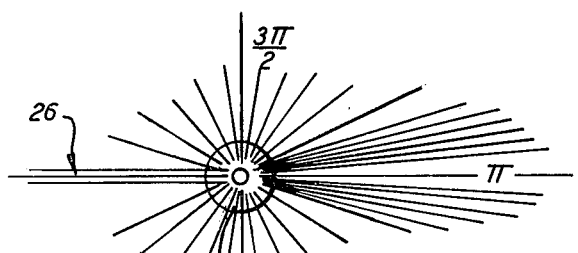
FIG. 2a is a diagrammatic plan view of a beam striking a hollow capillary tube, illustrating the principle of the invention in a first embodiment.

In FIG. 2a, beam 26 is directed along an optical axis perpendicular to and intersecting the axis of capillary tube 28. The diameter of the bore or internal cylindrical surface is significantly smaller than the diameter of the outside cylindrical surface, e.g., 1/5th. The diameter of beam 26 is equal to or less than the outside diameter and equal to or greater than the inside diameter of tube 28. Although there will be some reflection off both the external and internal cylindrical surfaces, tube 28 is transparent and none of the surfaces are coated or treated with reflective or other materials. Such an arrangement will produce a scan having a thickness or axial dimension equal to the diameter of original beam 26 and radiating outwardly for essentially 360° about tube 28.

Figure 2B:
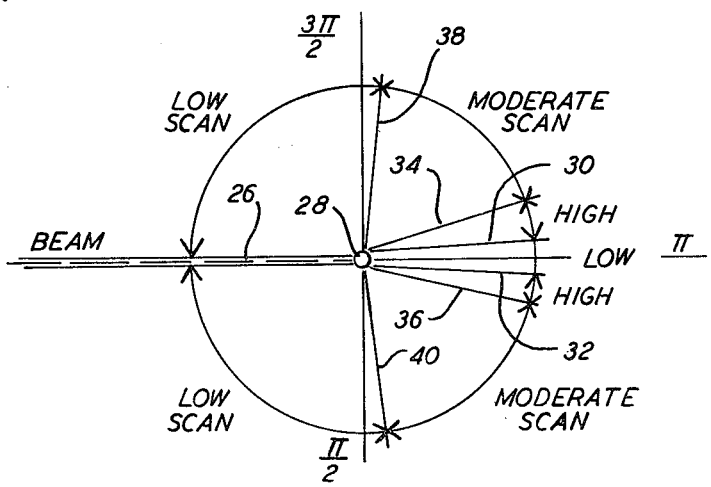

The relative intensities in various radial portions of the scan are as generally indicated in FIG. 2b. There is a shadow, or area of relatively low intensity directly opposite the entry of beam 26, between lines 30 and 32. The actual intensity in this area will depend to some extent upon the size of the beam which, if it is of larger diameter than the bore of tube 28, will be diffracted around the internal cylindrical surface. The areas between lines 30 and 34, and between lines 32 and 36 are of the highest intensity; those between lines 34 and 38, and between lines 36 and 40 are of moderate intensity, while the area between lines 38 and 40 is also of relatively low intensity except, of course, in the immediate area of beam 26. The transitions between high, moderate and low intensities are not as abrupt as would be indicated by the lines dividing the various segments, but are rather distinct. Thus, a 360° beam having an essentially finite axial dimension equal to the diameter of the original beam, and infinite radial dimension in all directions, is achieved by striking a hollow capillary tube with a beam of collimated, coherent radiation. The axes of the beam and tube must be in perpendicularly intersecting alignment for best results in this and the subsequently described embodiments.

Figure 3A:
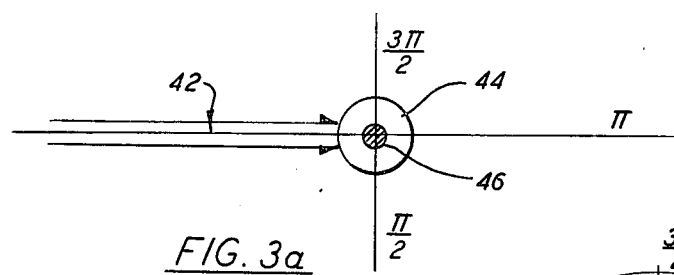
FIG. 3a is a diagrammatic plan view of a beam striking a capillary tube filled with mercury.
Figure 3C:
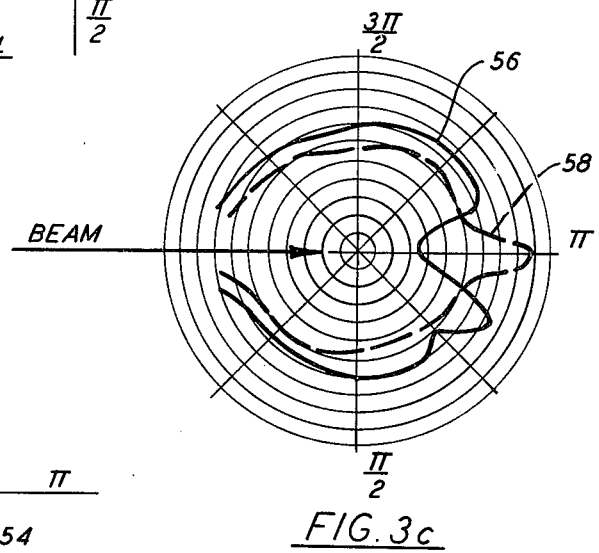
FIG. 3c shows superimposed curves on polar coordinates of the radial intensities of the two beams after striking the tubes of FIGS. 3a and 3b, respectively.

Turning now to FIG. 3a, beam 42 is directed on one side of capillary tube 44, the bore of which is filled with mercury 46, or any other liquid, solid or gaseous substance which is highly reflective with respect to the wavelength of beam 42. The internal cylindrical surface of tube 44 may simply be coated with the reflective material, but it is normally more convenient to fill the bore completely, particularly where relatively small tubes are used. The resulting scan is more uniform in intensity throughout the various radial portions than that produced with a hollow capillary tube.

Figure 3B:
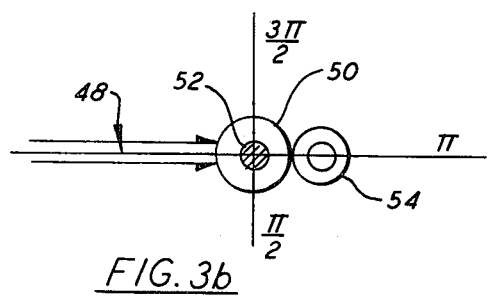
FIG. 3b is a diagrammatic plan view of a beam striking a capillary tube filled with mercury with a second, hollow capillary tube on the side of the first tube opposite the side of beam incidence.

In FIG. 3b, beam 48 is directed on capillary tube 50, the central bore of which is filled with mercury or other reflective material 52. An additional, hollow capillary tube 54 is placed tangent and parallel to tube 50 on the axis of beam 48. The second capillary, in this case, is also a relatively thickwalled tube of smaller diameter than the primary optic, i.e., tube 50. In one actual experiment, for example, the primary, mercury-filled capillary was 2.6 mm in diameter (outside) and the secondary, open capillary was 2.0 mm.

A secondary optic such as open capillary 54 tends to re-direct some of the radiation passing through the primary optic into the area otherwise shaded by the mercury, i.e., in the "$\pi$" direction. This may be clearly seen from FIG. 3c, wherein solid line curve 56 and dash line curve 58 indicate actual, measured intensities of the scans about tube 44, used as a single optic, and tube 50, used with secondary optic 54, respectively. Tubes 44 and 50 were of the same inside (about 0.3 mm) and outside (2.6 mm) diameters and both were filled with mercury in the bores. Intensities of each scan were measured with a CdS photodetector positioned at 24 discrete points equidistant (90 mm) from the centers of the primary optics. Thus, the centers of the points at which readings were taken were spaced by approximately 23.56 mm about a circle coaxial with tubes 44 and 50; the effective surface of the photodetector was 9.5 mm in width. The plotted intensities indicate relative values of the electrical readings obtained from exposure of the photodetector rather than specific units.

While intensity at all portions of the scan using only the primary optic (curve 56) is substantially uniform except between $(11/12)\pi$ and $(13/12)\pi$, there is a marked decrease in this area due to shading by the mercury. Use of the secondary optic, on the other hand, provides increased intensity in approximately the same portion of the scan. If a substantially uniform scan intensity about the entire periphery is desired, the radiation may be attenuated in the $(11/12)\pi$ to $(13/12)\pi$ portion of the scan by various filtering techniques, including the selective application of attenuating coatings to one or more surfaces of tubes 50 and/or 54, or by the use of additional optics.

Figure 4A:
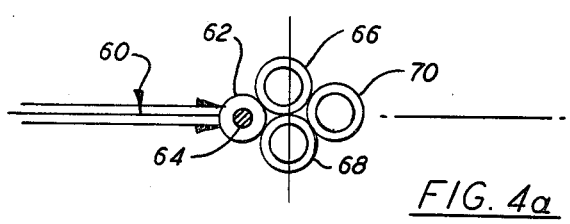
FIG. 4a is diagrammatic plan view of a beam striking a capillary tube filled with mercury with three additional, relatively thin-walled tubes positioned in axially parallel proximity thereto.
Figure 4B:
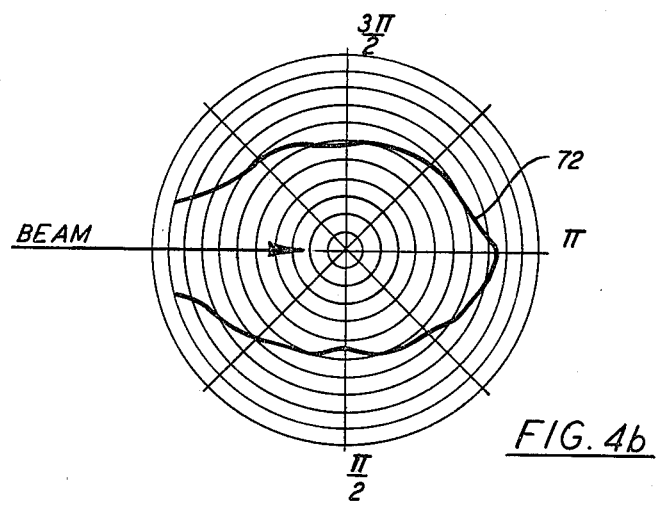

In FIG. 4a is illustrated an arrangement wherein beam 60 is directed upon capillary tube 62 filled with mercury 64. The secondary optics in this case include three relatively thin-walled tubes 66, 68 and 70, of equal outside and inside diameters, all axially parallel to one another and to capillary 62. Tubes 66 and 68 are in tangential contact with one another and with both tubes 62 and 70. In an actual experiment, resulting in measured scan intensity represented by curve 72 in FIG. 4b, the following values were used:

Primary optic:

1.4 mm outside diameter
0.3 mm inside diameter
mercury interior
Secondary optics:
1.8 mm outside diameter
1.2 mm inside diameter
air interior
Beam:
mode TEM
wavelength 6328 A°
diameter 0.51 mm
divergence 1.0–1.5 m rad.

The laser and tube array must be level and plumb, i.e., the axis of the beam should be as closely as possible perpendicular to the tube axes. The material of the tubes may be any conventionally used substance which is transparent with respect to the wavelength of the beam being used.

Thus, it is apparent that a 360° scan having a substantially constant, or virtually any other desired intensity distribution may be obtained by striking a capillary tube in the manner described with a beam of coherent radiation. Due to phase differences produced by reflections from both of the concentric cylindrical surfaces of the tube and internal refraction, interference lines may be present in some or all portions of the scan. These may be desirable in some applications, but if they are not, they may be eliminated by using a capillary tube having a wall thickness equal to one-quarter of the wavelength of the radiation; alternatively, their effect may be minimized by using radiation of shorter wavelengths, by rougeing the surfaces from which the beam emerges, or other such known practises. There should be no losses from absorption and scatter, but stryations due to scratches may cause some attenuation, as would impurities, etc., depending mainly upon the quality of the tubes used. The size and divergence of the incident beam will determine the axial dimension (thickness) and divergence of the radiating beam.

Figure 5:
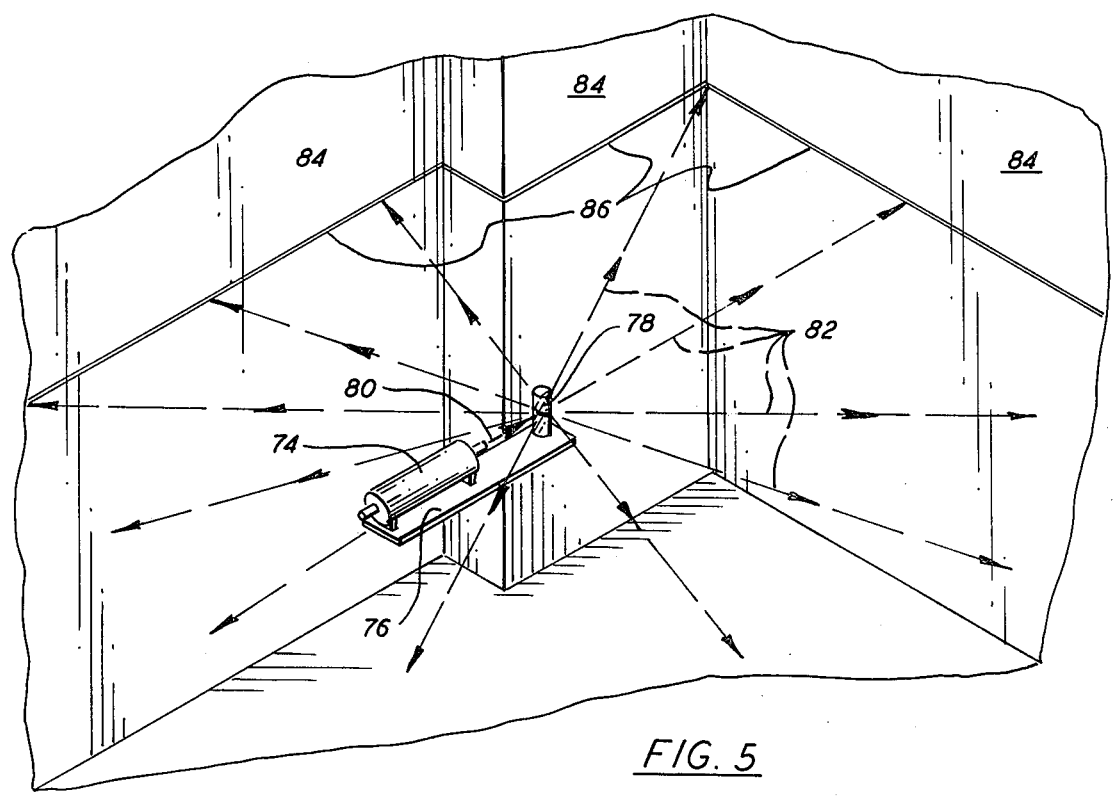
FIG. 5 is a perspective view of a laser device employed in conjunction with the optical elements of FIGS. 2-4 to produce an essentially planar, horizontal beam.

FIG. 5 illustrates a simple application of the invention as a levelling device or surveying instrument. Conventional laser device 74 is mounted on support 76, which in turn may be supported on a tripod or any other such support means. Optic 78, including at least one capillary tube and any other desired secondary optics, as previously described, is likewise supported with its longitudinal axis perpendicularly intersecting the optical axis of beam 80, emanating from laser devices 74. Preferably, conventional means (not shown) are provided for adjustably aligning the axis of the optic relative to that of the incident beam. The resulting 360° scan is indicated generally by rays 82, which intersect vertical surfaces 84 along straight line 86 which will be exactly horizontal, or in any other desired, precisely predetermined relationship to the orientation of optic 78, which is always aligned perpendicular to beam 80.

Figure 6:
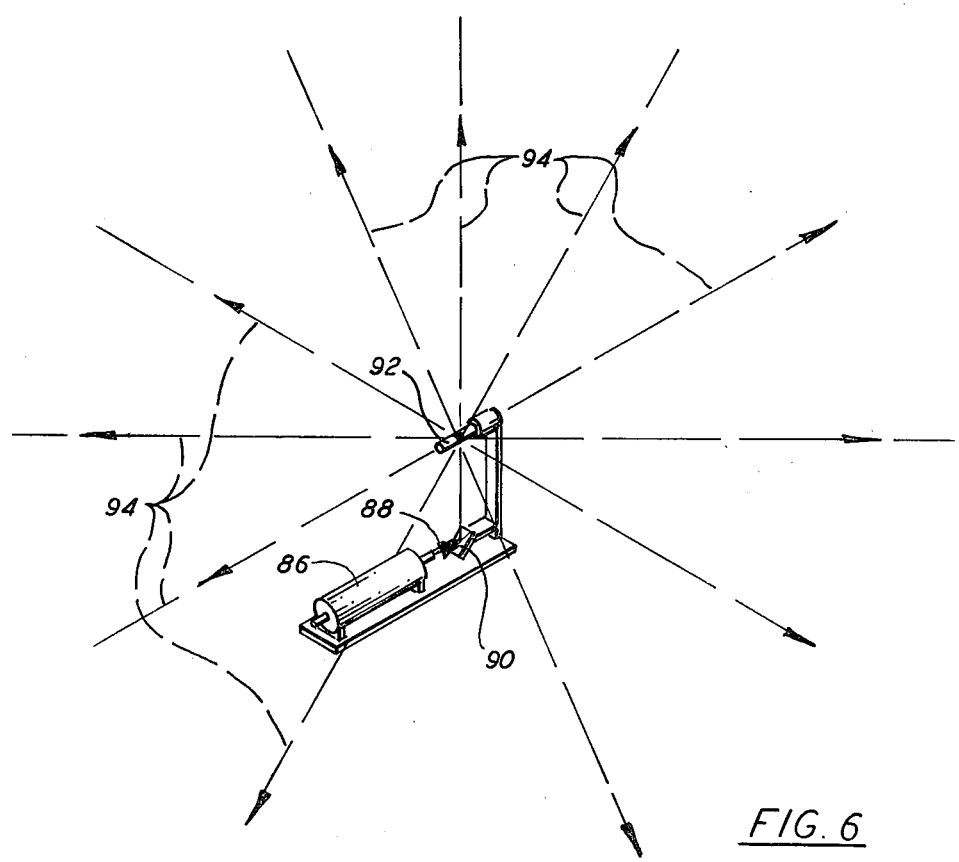
FIG. 6 is a similar perspective view of the elements of FIG. 5 arranged to produce a beam in a vertical plane.

FIG. 6 provides an additional illustration of employment of the invention to provide a 360° scan in a plane perpendicular to the original beam. Laser device 86 directs beam 88 upon mirror 90, thus redirecting the optical axis to a path perpendicular to and intersecting the axis of capillary tube 92. Assuming beam 88 to be directed along a horizontal axis and mirror 90 to be at exactly 45° with respect thereto, the resulting scan, represented by rays 94 will be in a vertical plane. Adjustment, alignment and support means are provided in any desired manner. Means may also be provided, in this or other relative orientations of original beam and optic, for rotating the optic 360° in the plane of its own longitudinal axis about a center of rotation at the intersection of the beam and optic axes (maintaining the axes perpendicular) to any desired, fixed position, thus allowing selective orientation of the scan in any desired plane about the beam axis. It is also apparent that the optic may be so positioned, with multiple reflections of the beam and the use of partly transmissive mirrors, if required, that shadows from the laser device, mounting elements, etc., may be eliminated.

From the foregoing disclosure of the use of tubular structures for radiating a beam in a 360° scan about a central axis, it is apparent that such a scan may also be obtained by generating a coherent beam in the space between the concentric cylindrical surfaces. That is, by pumping an active medium within the space to a sufficient radiant energy level, and by making the radial distance between the cylindrical surfaces equal to an integral number of half wavelengths of such radiant energy, lasing will occur. The generated beam will pass through the less reflective of the cylindrical surfaces in a 360° scan, either outwardly or inwardly. The lasing should occur as in any conventional resonator system, assuming absorption and emission lineshape broadening is fulfilled. The principles are the same whether the active medium is an atomic, molecular or ionized gas or a solid.

Figure 7:
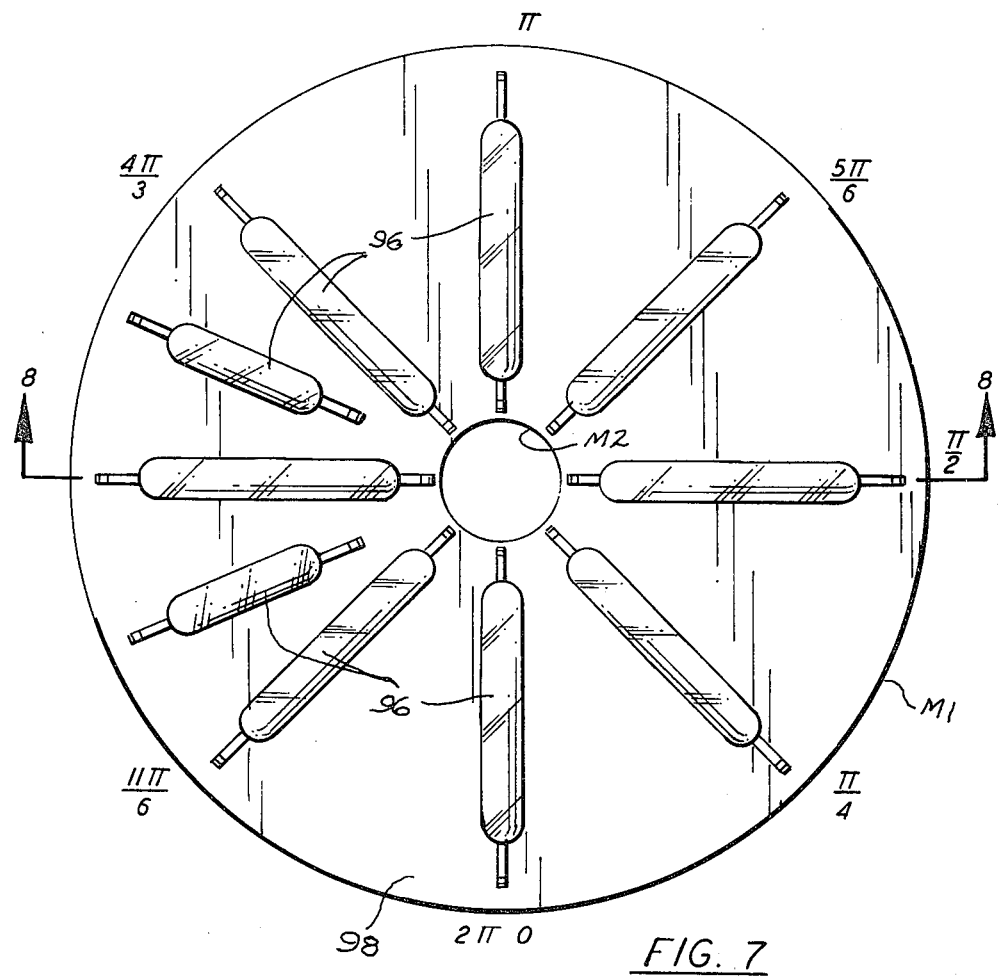
FIG. 7 is a plan view of a laser device utilizing a solid active medium and constructed according to a second embodiment of the invention.
Figure 8:
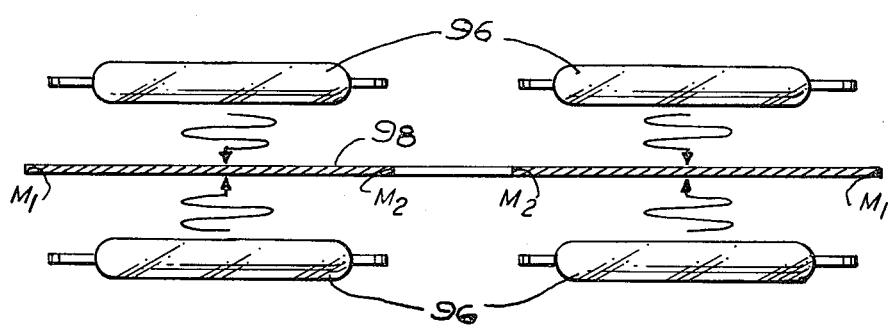
FIG. 8 is an elevational view in section on the line 8—8 of FIG. 7.

Referring now to FIGS. 7 and 8, an example of apparatus comprising a solid state laser according to the present invention is shown. The means for exciting the photons in the active medium comprise an array of flashlamps 96, supported on each side of an annular disc 98 of material such as ruby, aluminum oxide, barium glass, or other such materials conventionally used in solid state lasers. The external and internal cylindrical surfaces of disc 98 are both polished and silvered to provide outer and inner cylindrical mirrors M1 and M2, respectively. The upper and lower surfaces of disc 98, i.e., those directly facing flashlamps 96, are flat, parallel, unsilvered and 100% transparent.

The medium is pumped in the Z axis, that is, transversely to the X-Y direction of reflection between the mirrors. Although both mirrors are highly reflective with respect to the wavelength of the reflected radiation, one must, of course, be more highly reflective than the other in order for the beam to radiate outside the cavity or solid medium. It is contemplated that the principles of the present invention may be applied in generating a beam which radiates either 360° outwardly by making the outer mirror less reflective than the inner mirror, or a beam which radiates inwardly through the inner mirror to a concentrated point of energy at the center by making the inner mirror less reflective.

Figure 9:
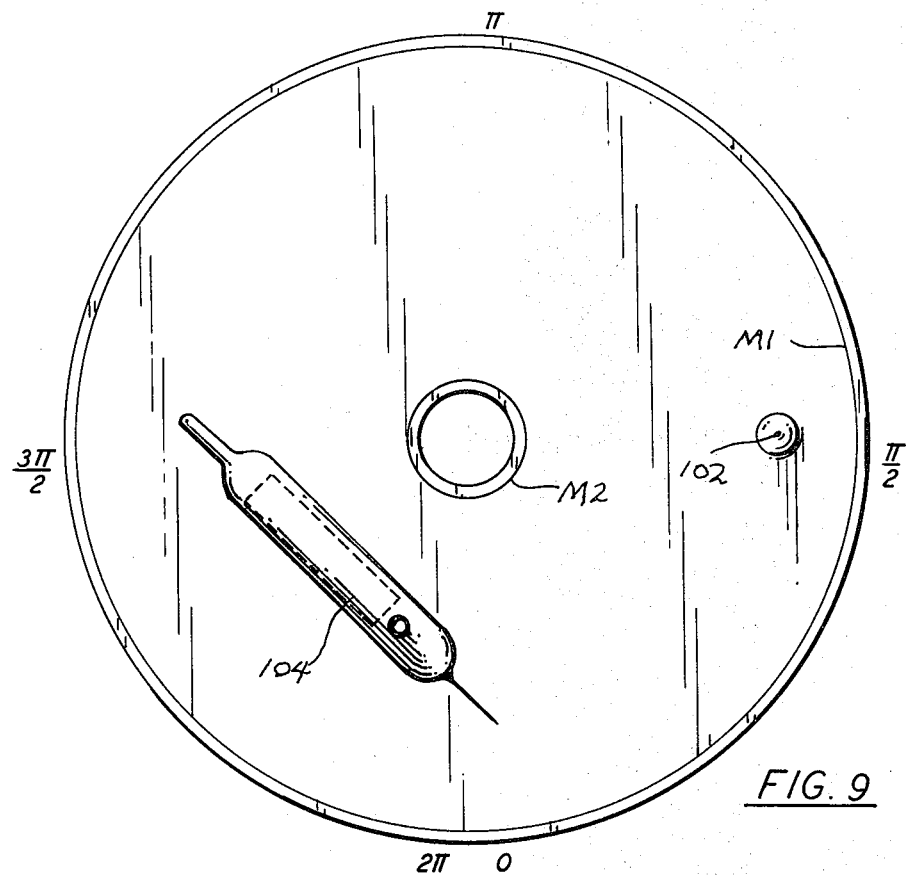
FIG. 9 is a plan view of another laser device embodying the invention and utilizing a gaseous active medium.
Figure 10:
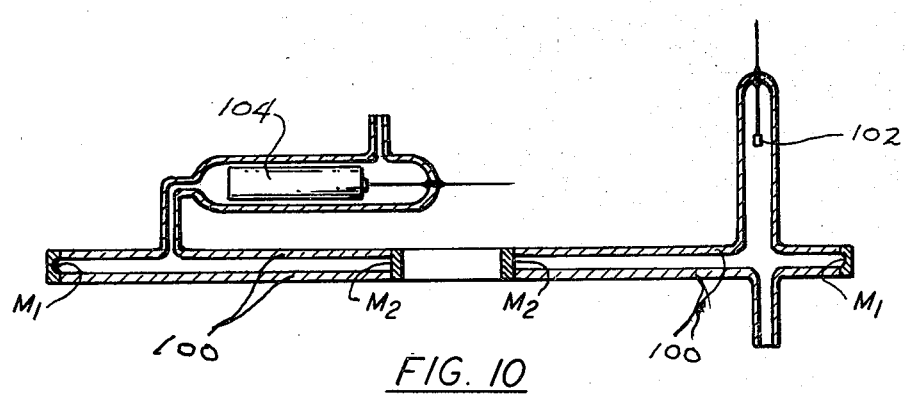
FIG. 10 is an elevational view in section on the line 10—10 of FIG. 9.

FIGS. 9 and 10 illustrate the application of the invention to a gas laser. Wall means 100 define an annular cavity containing a gas of any type suitable for use in laser devices. Anode 102 and cathode 104 communicate with the cavity, and receive power from an appropriate source (not shown) to apply an electrical field of the gas sufficient to excite the atoms, molecules and/or ions thereof to produce radiant energy for multiple reflection between outer and inner concentric, cylindrical mirrors M1 and M2, respectively. The beam will radiate, as before, either outwardly or inwardly, depending on the relative reflectivities of the two mirrors, but in any case will be a 360° scan.

Figure 11:
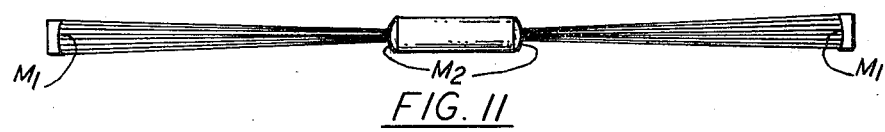
FIG. 11 is a diagrammatic illustration of an example of a mirror configuration which may be employed in the lasers of FIGS. 7–10.

Cylindrical mirrors M1 and M2 of the solid state laser of FIGS. 7 and 8 are indicated to be both planar in side section, whereas those of the gas laser of FIGS. 9 and 10 are concave-planar. Other optical configurations, such as a concave-convex mirror arrangement of FIG. 11 may also be utilized. In this system the beam would be reflected as indicated between outer, concave, cylindrical mirror M1 and inner, convex, cylindrical mirror M2.

From the foregoing description it is seen that the present invention provides a method and means for generating a beam of coherent radiation in a 360° scan about a central axis perpendicular to the beam. The beam has a finite axial dimension and may radiate either outwardly from or inwardly toward the central axis. The beam is produced by multiple reflections of coherent radiation between two concentric, cylindrical mirrors. A wavefront may be introduced into the annular space between the two mirrors either from an external source, passing through the outer mirror into the space, or be generated within the space as by pumping an active medium therein. In either case, there are no moving parts to the system, the 360° scan being generated entirely with static components.

What is claimed is:

1. A laser device comprising:
   (a) an active gas medium within a resonant cavity bounded by two opposed spaced, concentric, cylindrical surfaces and two spaced, parallel, planar surfaces perpendicular to the common axis of said cylindrical surfaces;
   (b) both of said cylindrical surfaces being highly reflective with respect to the wavelength of radiation produced by excitation of said active gas medium, one being more highly reflective than the other;
   (c) said cylindrical surfaces being spaced by a radial distance substantially equal to an integral number of half wavelengths of said radiation; and
   (d) pump means for applying an electrical field to said active gas medium to excite the latter to a level sufficient to produce lasing.

2. The invention according to claim 1 wherein the cylinder of smaller diameter is the more highly reflective, whereby said radiation passes outwardly 360° through the cylinder of larger diameter.

3. The invention according to claim 1 wherein the cylinder of larger diameter is the more highly reflective, whereby said radiation passes inwardly 360° through the cylinder of smaller diameter, being concentrated at said common axis of said cylindrical surfaces.

4. Apparatus for producing a scan of coherent radiation extending substantially 360° about a central location with static elements, said apparatus comprising:
   (a) means for generating a collimated beam of coherent radiation having finite transverse dimensions and directing said beam along an optical axis; and
   (b) a primary optic comprising a solid, cylindrical tube having a central, cylindrical bore and substantially internally transparent with respect to said radiation positioned with its longitudinal axis perpendicular to and intersecting said optical axis, said beam having a transverse dimension not greater than the diameter of said tube and not less than the diameter of said bore.

5. The dimension according to claim 4 and further including a material highly reflective with respect to said radiation covering the inner cylindrical surface of said bore.

6. The invention according to claim 5 wherein said reflective material fills said bore.

7. The invention according to claim 6 wherein said reflective material is mercury.

8. The invention according to claims 4, 5, 6 or 7 wherein said means for generating a collimated beam is a laser device.

9. The invention according to claims 4, 5, 6 or 7 and further including a secondary optic comprising at least one additional solid, cylindrical tube having a central, cylindrical bore and substantially internally transparent with respect to said radiation positioned with its axis parallel to that of said primary optic, said secondary optic intercepting and redirecting a portion of the beam radiating from said primary optic to render the intensity of said beam outwardly of said secondary optic more uniform in radial segments thereof.

* * * * *